Nov. 20, 1945.   H. F. VICKERS   2,389,473
TIMING DEVICE FOR POWER TRANSMISSION SYSTEMS
Original Filed Jan. 27, 1940
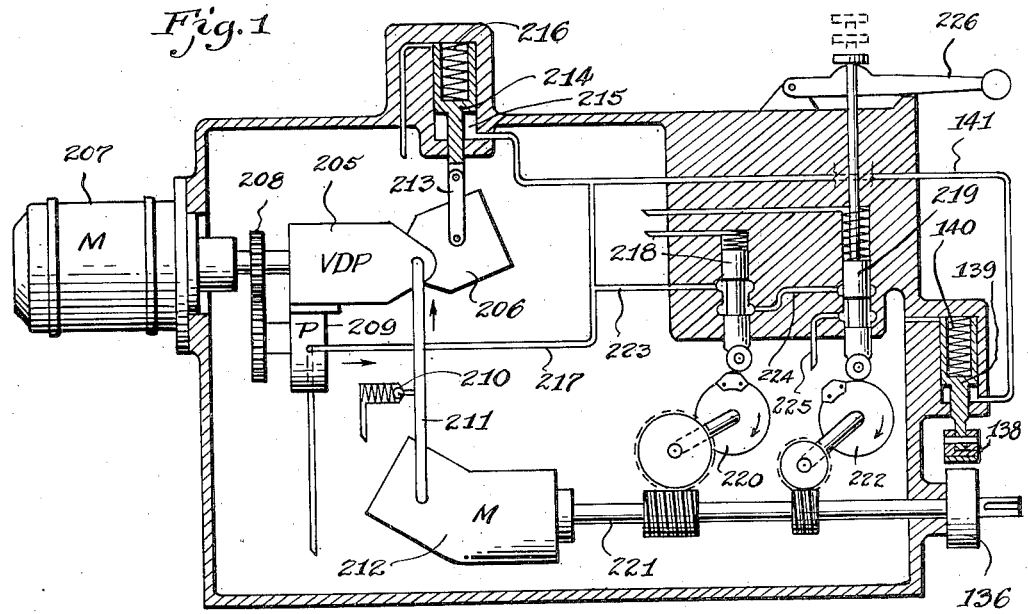
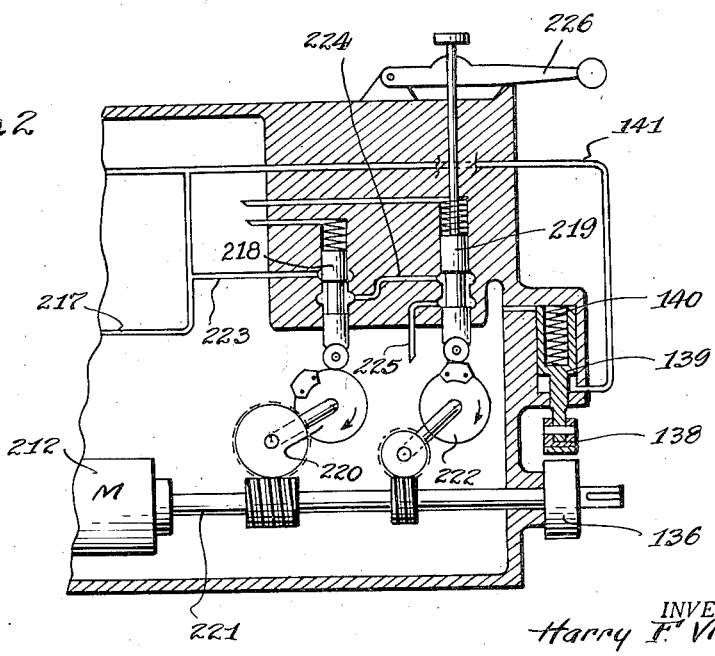
INVENTOR.
Harry F. Vickers
BY
Barnes, Kisselle, Laughlin & Raisch
Attorneys.

Patented Nov. 20, 1945

2,389,473

UNITED STATES PATENT OFFICE 2,389,473

TIMING DEVICE FOR POWER TRANSMISSION SYSTEMS

Harry F. Vickers, Detroit, Mich., assignor to Vickers Incorporated, Detroit, Mich., a corporation of Michigan Original application January 27, 1940, Serial No. 315,889, now Patent No. 2,326,184, dated August 10, 1943. Divided and this application August 9, 1943, Serial No. 497,880

2 Claims. (Cl. 60—53)

This invention relates to timing devices for power transmission systems and has particularly to do with a hydraulic timing control system.

This application is a divisional of applicant's copending application, Serial No. 315,889, filed January 27, 1940, now matured into Patent No. 2,326,184, dated August 10, 1943.

The need for accurate control of power driven machinery especially in machine tool drives is well recognized. The present invention has for its object the provision of a precision timing arrangement especially adapted for hydraulic transmission equipment for machinery and machine tools and other types of control where accuracy is required. In those particular systems in which it is the practice to have a slow moving drive shaft and an output shaft which makes several revolutions to one revolution of the drive shaft, it will be seen that a small deviation in the timing device at the drive will be greatly multiplied at the output. In many cases the timing control must be connected to the drive and consequently it is essential that it be accurate.

It is a further object of the present invention to provide a timing arrangement in which the output shaft of a control system may be stopped within a few degrees of the same point in each cycle. An added feature of the device is that it may be adapted to practically any type of power system and certain objects of the invention have to do with the combination of the basic timing control with various hydraulic power systems.

Briefly, the invention consists of introducing into a hydraulic circuit two or more interconnected timing valves which are actuated from a power shaft. These valves are preferably arranged to be shifted by said shaft at different rates of movement so that at one particular point in a cycle of movement, each of the valves will have reached a definite control position which will produce a response in the system and cause a change in the operation of the driving shaft. This change may either be a stopping or a reversal or, in some cases, it might be simply a change in speed. The present invention is particularly useful in devices having long or continuous operation in which the oil heats and becomes thin. With a single counter-valve control, as the valve approaches stop position there may be leakage which will cause premature stopping or change of direction. With the provision of a "tripper" valve as well as the "counter" valve, the tripper serves as a check or seal for the counter-valve until the exact moment at which the change in action should take place.

Other objects and features of the invention relating, for example, to details of hydraulic system in which the control of the present invention may be embodied, will be brought out in detail in the following description and claims.

In the drawing:

Fig. 1 illustrates the invention embodied in a system in which the power element is controlled by a variable displacement pressure source.

Fig. 2 shows a portion of Fig. 1 with the parts in a different operative position.

In Figs. 1 and 2 the invention is illustrated in connection with a hydraulic system which utilizes a variable displacement pump as a source of pressure. This pump, shown at 205, has a tilting block 206, the position of which controls the output of the pump. A motor 207 drives this pump and also, through gear train 208, drives a pilot pump 209. A relief valve 210 is provided in a conduit 211 leading from the pump 205 to a motor 212. Another conduit (not shown) is provided to conduct the return flow from the motor 212 to the pump. Whether or not the pump 205 delivers liquid to the motor will depend on the position of the tilting block 206. Through suitable linkage 213 a piston 214 is connected to the tilting block 206. This piston is located in a chamber 215 and a spring 216 urges the piston downwardly and tends to move the tilting block to a neutral or non-volume position.

Pilot pressure from pump 209 is connected by a conduit 217 to chamber 215. When this pilot pressure is maintained against piston 214, there will be a volume output of pump 205 and a movement of motor 212. A venting of this pilot pressure to the tank will cause the spring to move the tilting block 206 to its neutral position and cause a stopping of the motor. The pilot pressure is controlled by a timing valve 218 and a timing valve 219. The valve 218 has a follower which rides on a cam 220 which rotates once in a predetermined number of revolutions of a shaft 221 on motor 212. Valve 219 has a follower which rides on a cam 222 which rotates once for every revolution of shaft 221. Conduit 217 is connected to valve 218 by a conduit 223 and with valve 218 in the position shown in Fig. 1, the conduit 223 is connected to a conduit 224 leading to valve 219. With valve 219 in the position shown, conduit 224 is blocked from a tank conduit 225 but a movement of valve 219 to the position shown in Fig. 2, will connect conduit 224 to the tank conduit 225.

Referring now to the operation of this system of Fig. 1, it will be seen that as the parts are viewed in the drawing, cam 220 has just shifted valve 218 to connect conduits 223 and 224. As cam 222 completes its revolution and moves to a position shown in Fig. 2, valve 219 will be lifted and there will be a venting of pressure in chamber 215 through the conduits shown to the tank conduit 225. In Fig. 2, the valve 218 is shown in its closed position as it normally rides on cam 220 and valve 219, as before mentioned, is shown in its open position. To start the system, after it has been automatically stopped, a manually operable lever 226 may be used to shift valve 219 upward to block the tank conduit 225 temporarily. As soon as valve 219 rides off the lobe of cam 222, the manual lever 226 may be released since conduit 224 will be caused to be blocked from conduit 225 by the spring of valve 219 moving it downwardly as shown in Fig. 1. Blocking of conduit 224 will, of course, cause pressure to build up in chamber 215 and start the volume output of pump 205. Just before cam 222 completes its first revolution, the lobe of cam 220 will have advanced to a point where it allows valve 218 to lower and block conduit 223.

A brake is shown in the drawing. A brake wheel 136 on shaft 221 is frictionally engaged by a shoe 138 on a spring backed piston 139. Spring 140 urges the piston downwardly to engage the brake. Release is obtained when pressure from pilot pump 20a builds up in line 141. Venting of line 141 through valves 218 and 219 causes the brake to engage.

I claim:

1. In a hydraulic control system, a source of pressure comprising a variable delivery pump, a movable part of said pump movable from a neutral position to an output position and adapted to control the volume output thereof, a motor to be operated by pressure from said pump, a source of pilot pressure, means responsive to said pilot pressure for controlling the output of said pump comprising pressure responsive means connected to said movable part, means normally urging said movable part to one of its position and means for influencing said pilot pressure to cause a change in the operation of said motor comprising a plurality of valve means, each responsive to a different degree to the movement of said motor, said valve means being arranged to cooperate at a predetermined point in the movement of said motor to influence said pilot pressure as aforesaid.

2. In a hydraulic control system, a source of pressure comprising a variable delivery pump, a movable part of said pump adapted to control the volume output thereof, a motor to be operated by pressure from said pump, a source of pilot pressure, means responsive to said pilot pressure for controlling the output of said pump comprising pressure responsive means connected to said movable part, means normally urging said movable part to its neutral position and means for relieving said pilot pressure to cause stopping of said motor comprising a plurality of valve means, each responsive to a different degree to the movement of said motor, said valve means being arranged to cooperate at a predetermined point in the movement of said motor to relieve said pilot pressure, and releasable means for locking said motor at a predetermined point in its movement, said means being rendered effective by the relieving of said pilot pressure from said pressure chamber.

HARRY F. VICKERS.